United States Patent [19]
Chiang

[11] Patent Number: 5,205,319
[45] Date of Patent: Apr. 27, 1993

[54] FLOAT-OPERATED VALVE ASSEMBLY

[76] Inventor: Wen-Chun Chiang, No. 47, Lane 142, Tzu-Chiang I Rd., Chien-Chin Dist., Kaohsiung City, Taiwan

[21] Appl. No.: 848,445

[22] Filed: Mar. 9, 1992

[51] Int. Cl.$^5$ ............................................. F16K 31/28
[52] U.S. Cl. .................... 137/423; 137/443; 251/230
[58] Field of Search ............... 137/423, 434, 442, 443, 137/446; 251/230; 141/198

[56] References Cited

U.S. PATENT DOCUMENTS

| | | | |
|---|---|---|---|
| 408,431 | 8/1889 | Powers | 137/442 |
| 418,162 | 12/1889 | Cahill | 137/443 |
| 998,543 | 7/1911 | Meyer | 137/442 |
| 1,044,408 | 11/1912 | Meyer | 137/443 |
| 1,052,939 | 2/1913 | Meyer | 137/443 |
| 2,756,769 | 7/1956 | Martin et al. | 137/443 |
| 3,040,769 | 6/1962 | Lamb | 137/423 |
| 4,266,582 | 5/1981 | Sergent | 137/423 |

Primary Examiner—George L. Walton
Attorney, Agent, or Firm—Townsend & Townsend

[57] ABSTRACT

A float-operated valve assembly for a water tank includes a valve housing provided inside the water tank and connected to an external water source. The valve housing has an outlet opening formed at an intermediate portion thereof. A ratchet pole extends into the valve housing and has an end portion which is formed with aligned ratchet teeth. The ratchet pole is provided with a stopper that is urged by water from the external water source so as to cut off water flow to the water tank. The float ball of a float ball assembly urges a pivot arm to apply a pushing force on the end portion of the ratchet pole so as to move the stopper and permit water flow to the water tank when water inside the water tank no longer applies a buoyant force on the float ball. A float-controlled pawl engages the ratchet teeth of the ratchet pole when water inside the water tank is below a predetermined level, thereby maintaining the stopper in an open position when the water tank is being refilled. The pawl disengages the ratchet teeth when water inside the water tank is at least equal to the predetermined level, thereby permitting water from the external water source to urge the stopper to cut off the water flow to the water tank when the water tank has been refilled.

7 Claims, 6 Drawing Sheets and at the link between the float arm (21) and the pivot arm (16).

3. Water flowing through the inlet pipe (20) may contain impurities (such as pieces of sandstones). Since the blocking action of the plug (13) is a gradual process, the impurities frequently rub against the plug (13) and may cause wearing of the same. Furthermore, the impurities may get stuck between the inlet pipe (20) and the plug (13), thereby preventing the latter from completely blocking the inlet pipe (20). The resulting water leakage can cause the water tank to overflow, thus leading to water wastage.

4. Effective blocking of the inlet pipe (20) is difficult to achieve since the different components of the conventional valve assembly are easily damaged.

5. The rate of water flow into the water tank is relatively slow since unblocking of the inlet pipe (20) is a gradual process.

FLOAT-OPERATED VALVE ASSEMBLY

BACKGROUND OF THE INVENTION

1. Field of the Invention

The invention relates to a float-operated valve assembly for a water tank, more particularly to an improved float-operated valve assembly which minimizes component damage and which can accomplish faster and more effective blocking and unblocking of the water supply to the water tank than can the prior art.

2. Description of the Related Art

A float-operated valve assembly is usually installed in a water tank so as to control the supply of water thereto. A conventional float-operated valve assembly is shown in FIG. 1 to comprise a hollow valve housing (10). A horizontal inlet pipe (20) is connected to the valve housing (10) adjacent to a top end of the latter. The valve housing (10) has a pipe section (100) which is aligned with and which is opposite to the inlet pipe (20). A piston (11) is slidably disposed inside the pipe section (100). The valve housing (10) is further provided with a downwardly extending outlet pipe (12). One end of the piston (11) is provided with a plug (13) to block the inlet pipe (20). The piston (11) further has a bottom side formed with a notch (14). The pipe section (100) has a slot (100a) which is aligned with and which is longer than the notch (14), and a downwardly extending pivot seat (15) disposed adjacent to the slot (100a). A substantially V-shaped pivot arm (16) has an intermediate portion pivoted to the pivot seat (15). The pivot arm (16) has one end which extends through the slot (100a) and the notch (14) and which is provided with an enlarged head (17). The other end of the pivot arm (16) is connected to one end of a float arm (21). A float ball (22) is connected to the other end of the float arm (21).

The operation of the above described conventional float-operated valve assembly is as follows: The float ball (22) moves in response to a change in the water level inside the water tank (not shown). As the water level gradually decreases, the float ball (22) gradually moves downward, thus causing the pivot arm (16) to rotate in a clockwise direction and gradually shift the piston (11) away from the inlet pipe (20). The plug (13) eventually departs from the inlet pipe (20), thereby causing water to flow into the water tank. As the water level gradually increases, the float ball (22) gradually moves upward, thus causing the pivot arm (16) to rotate in a counterclockwise direction and gradually shift the piston (11) toward the inlet pipe (20). The plug (13) eventually blocks the inlet pipe (20), thereby stopping water flow into the water tank.

The drawbacks of the above-disclosed float-operated valve assembly are as follows:

1. Blocking of the inlet pipe (20) is a gradual process. The water level inside the water tank is in a rippling state as long as the plug (13) has not yet completely cut off the water supply to the water tank. The unstable movement of the float ball (22) due to the rippling of the water level can cause wearing of the plug (13) and can also cause wearing at the joint of the pivot arm (16) and the pivot seat (15).

2. Note that water pressure from the external water source opposes the blocking movement of the piston (11). The float ball (22) is used to overcome the force exerted by water pressure. This can cause damage at the link between the float arm (21) and the float ball (22)

SUMMARY OF THE INVENTION

Therefore, the objective of the present invention is to provide an improved float-operated valve assembly which can overcome the drawbacks commonly associated with the above disclosed prior art.

More specifically, the main objective of the present invention is to provide an improved float-operated valve assembly which can minimize component damage and which can accomplish faster and more effective blocking and unblocking of the water supply to the water tank than can the prior art.

Accordingly, the preferred embodiment of a float-operated valve assembly of the present invention comprises:

a valve housing to be provided inside the water tank and being formed as an elongated pipe member having a first end to be connected to an external water source, a second end sealingly closed by a cover plate, an outlet opening formed at an intermediate portion of the valve housing, and a partition plate provided inside the valve housing between the first end and the outlet opening and being formed with an inlet opening;

a float ball assembly including: a pivot arm pivotably secured to the valve housing and having a downwardly extending part disposed adjacent to the cover plate; a first float arm having one end secured to the downwardly extending part of the pivot arm; and a primary float ball mounted on the other end of the first float arm and having an appropriate weight; and an arresting mechanism including: a ratchet pole extending into the valve housing and having an end portion which extends through the cover plate adjacent to the downwardly extending part of the pivot arm, said end portion being formed with aligned ratchet teeth, said ratchet pole having one section which extends between the partition plate and the second end of the valve housing and which is provided with a circumferential flange, said flange having one side which faces the partition plate and which is provided with a stopper, said flange being urged by water from the external water source so that the stopper blocks the inlet opening, said primary float ball urging the downwardly extending part of the pivot arm to apply a pushing force on the end portion of the ratchet pole so as to move the stopper away from the inlet opening when water inside the water tank no longer applies a buoyant force on the primary float ball; and a float-controlled pawl means adapted to engage the ratchet teeth of the ratchet pole when water inside the water tank is below a predetermined level so as to arrest untimely movement of the stopper toward the inlet opening when the water tank is being refilled, said pawl means disengaging the ratchet teeth of the ratchet pole when water inside the water tank is at least equal to the predetermined level so as to permit water from the external water source to urge the flange and force the stopper to block said inlet opening when said water tank has been refilled.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 2:
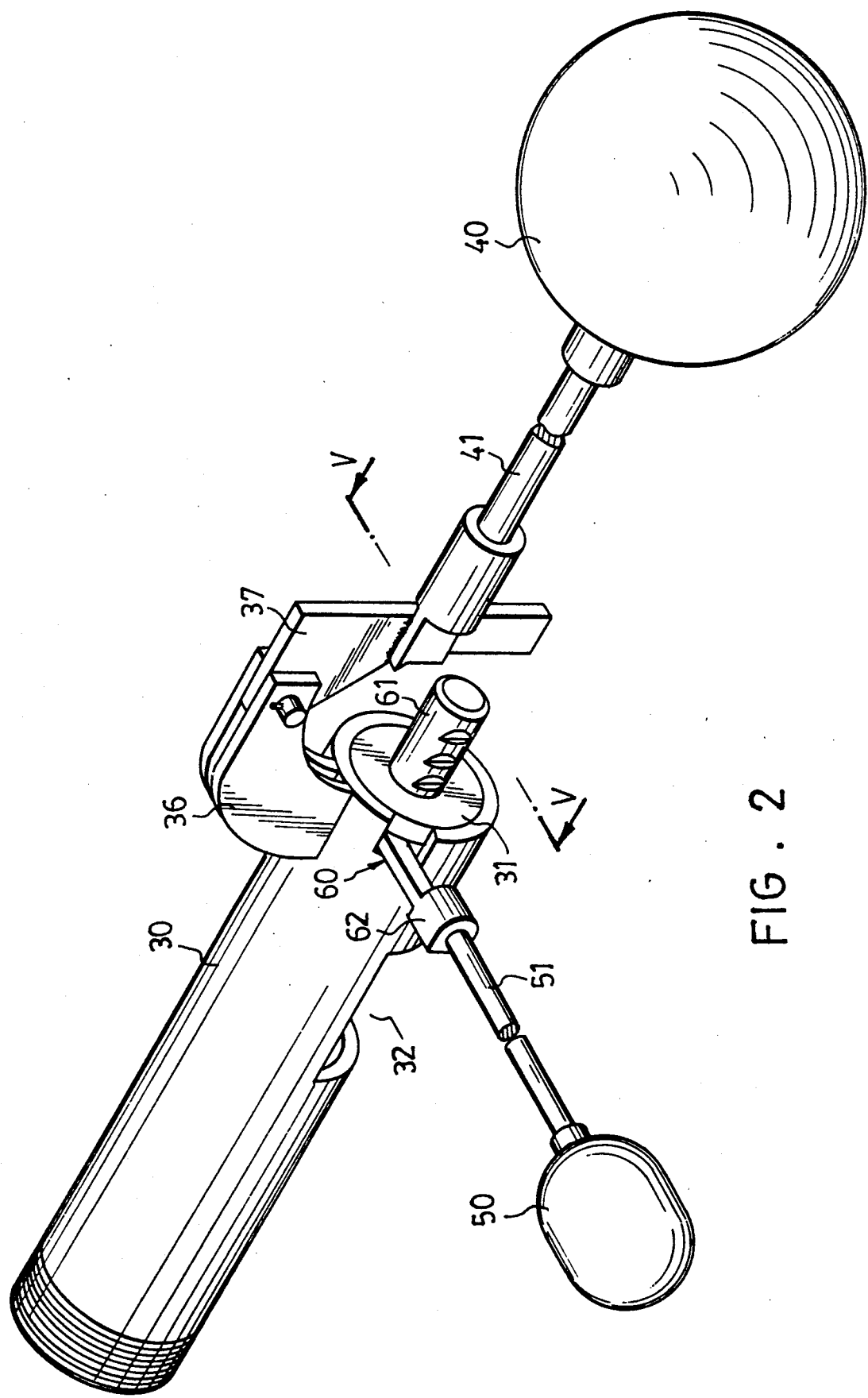
FIG. 2 is a perspective view of the preferred embodiment of a float-operated valve assembly according to the present invention.

Referring to FIG. 2, the preferred embodiment of a float-operated valve assembly according to the present invention is shown to comprise a valve housing (30), a primary float ball (40), a secondary float ball (50) and an arresting mechanism (60) which is operably associated with the secondary float ball (50).

Figure 3:
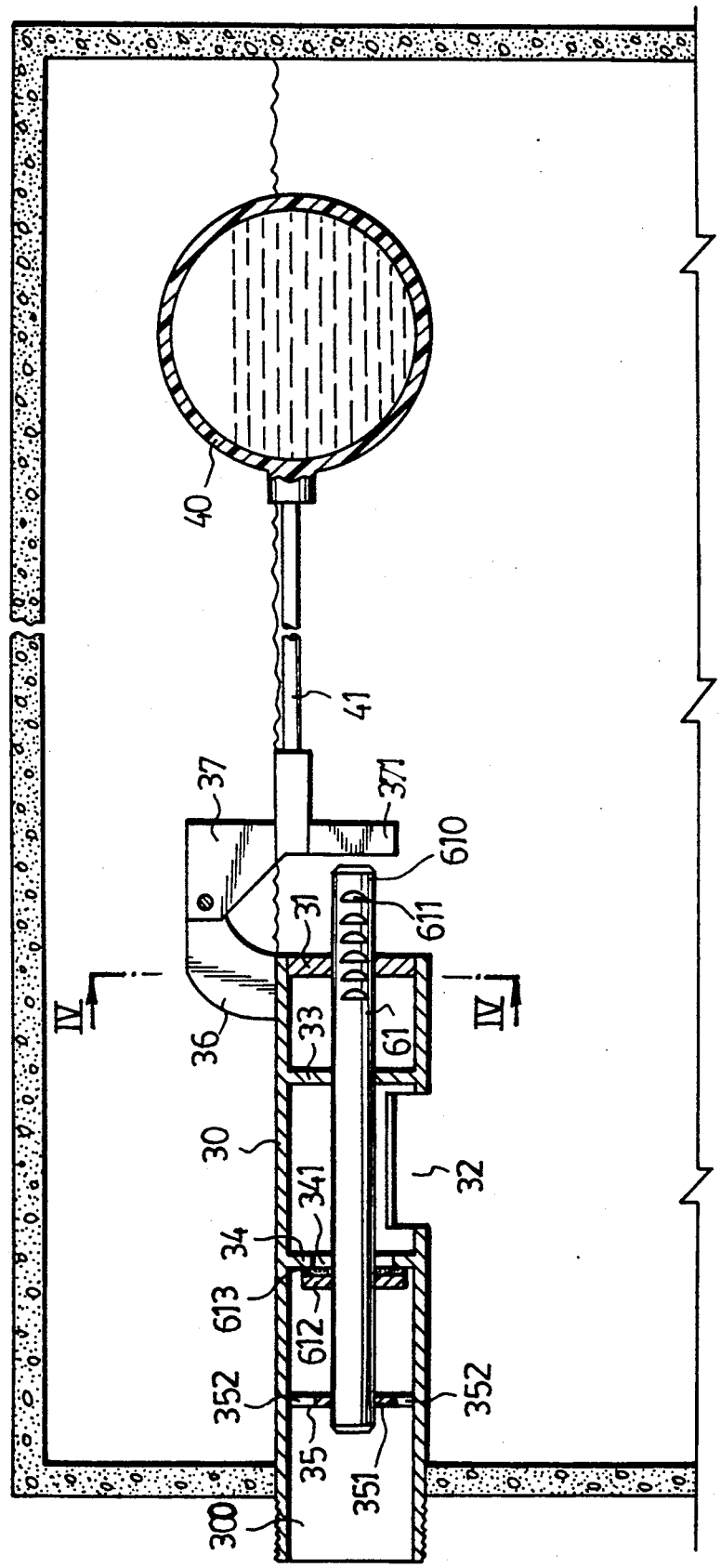
FIG. 3 is a longitudinal section of the preferred embodiment as shown in FIG. 2.
Figure 4:
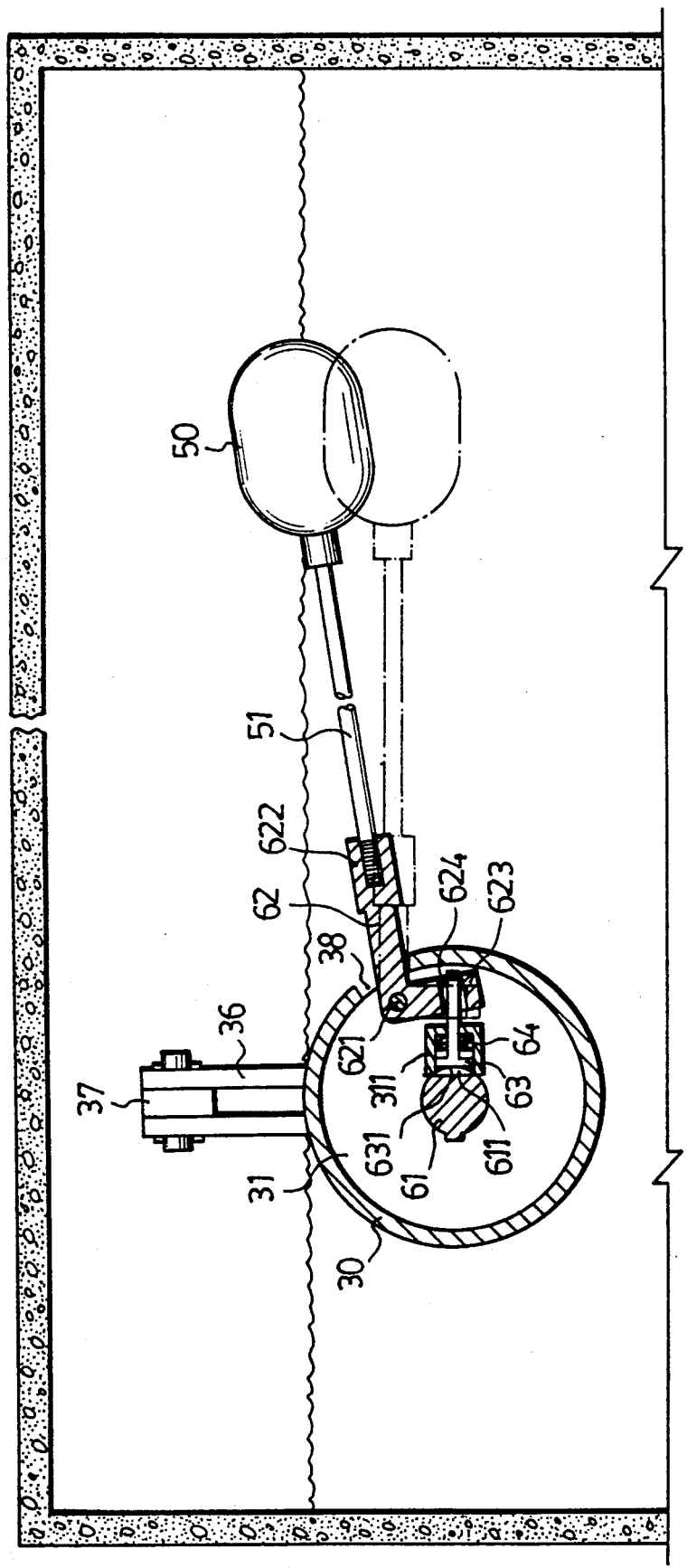
FIG. 4 is a sectional view of FIG. 3 taken substantially along line IV—IV.
Figure 5:
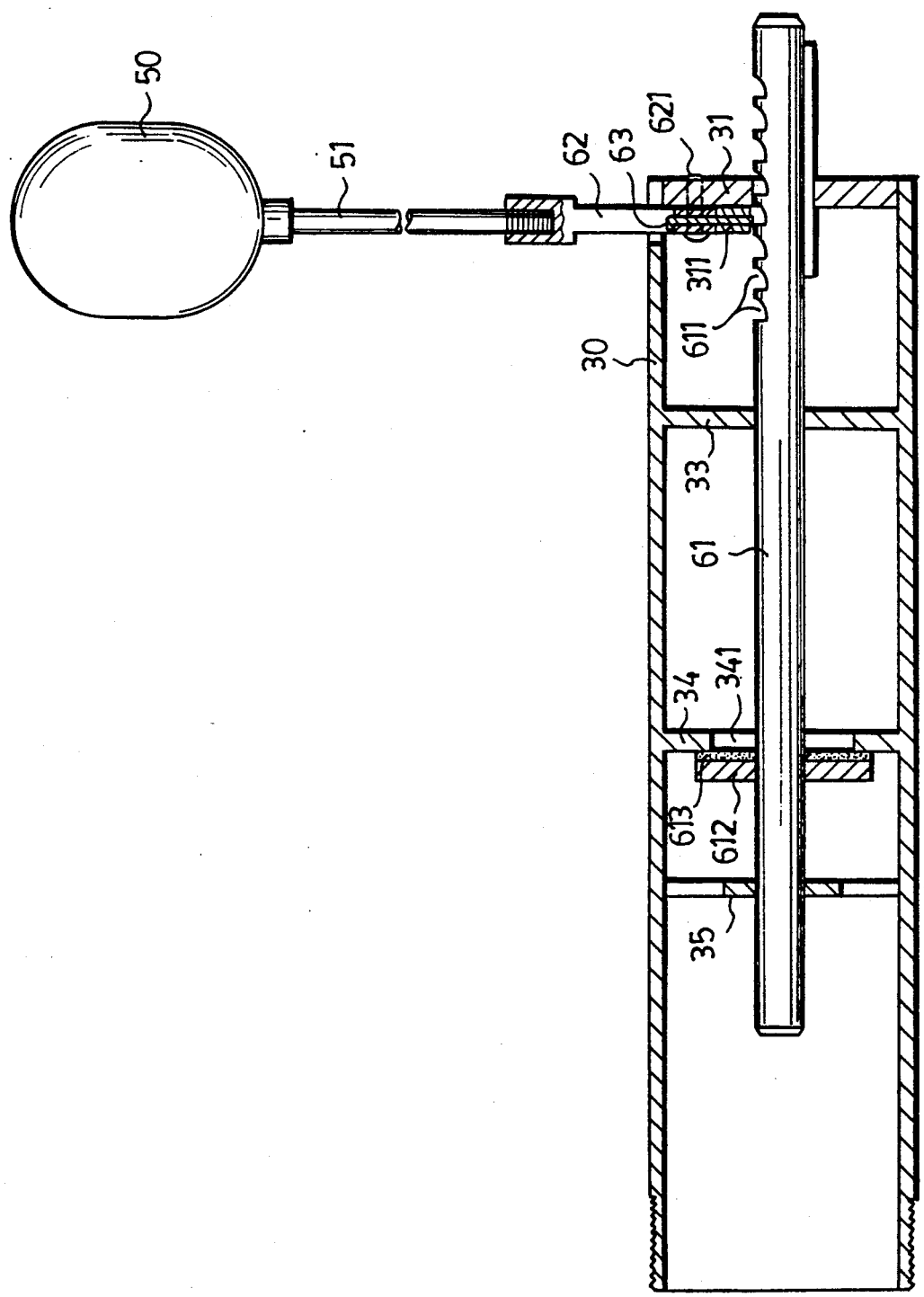
FIG. 5 is a sectional view of FIG. 2 taken substantially along line V—V.

Referring to FIG. 3, the valve housing (30) is formed as an elongated pipe member which has a first end (300) that is to be connected to an external water source and a second end which is sealingly closed by a cover plate (31). The valve housing (30) has an outlet opening (32) formed at the intermediate portion of a bottom side thereof. The interior of the valve housing (30) is provided with a guide plate (33) disposed between the cover plate (31) and the outlet opening (32), a partition plate (34) disposed between the first end (300) and the outlet opening (32), and a support member (35) disposed between the first end (300) and the partition plate (34). The support member (35) includes an annular portion (351) which is connected to the inner wall surface of valve housing (30) by a plurality of angularly spaced radial ribs (352). The partition plate (34) is formed with a central inlet opening (341). A hinge seat (36) is formed on a top side of the valve housing (30) adjacent to the cover plate (31). A pivot arm (37) is pivotably secured to the hinge seat (36). A float arm (41) has one end which is secured to a downwardly extending part (371) of the pivot arm (37). The primary float ball (40) is mounted on the other end of the float arm (41). The primary float ball (40) is a hollow spherical body which contains a predetermined volume of water. In this embodiment, the primary float ball (40) is preferably two-thirds full of water.

Referring to FIGS. 2 to 5, the secondary float ball (50) is at right angles with the primary float ball (40). A float arm (62) connects the secondary float ball (50) to a connector (62) of the arresting mechanism (60). The arresting mechanism (60) includes a ratchet pole (61), a pawl piece (63) and a spring member (64). The ratchet pole (61) extends into the respective central through holes formed in the support member (35) and the guide plate (33), and has an end portion (610) which extends through the cover plate (31). The end portion (610) is formed with aligned ratchet teeth (611). The section of the ratchet pole (61) which extends between the support member (35) and the partition plate (34) is provided with a circumferential flange (612). One side of the flange (612) faces the partition plate (34) and is provided with a stopper (613). The size of the stopper (613) should be sufficient to block the inlet opening (341). The valve housing (30) is formed with an arcuate peripheral notch (38) adjacent to the cover plate (31), and a radial projection which protrudes inwardly adjacent to the notch (38). A locking pin (621) pivotally joins an intermediate portion of the connector (62) to the radial projection. One leg (622) of the connector (62) extends outside the valve housing (30) so as to join with the float arm (51). The other leg (623) of the connector (62) extends inside the valve housing (30) and is connected to the pawl piece (63). The inner side of the cover plate (31) is provided with a substantially U-shaped seat (311) which is disposed between the leg (623) of the connector (62) and the ratchet pole (61). The seat (311) has an open side which faces the ratchet teeth (611) of the ratchet pole (61). The pawl piece (63) has an enlarged head portion (631) which extends into the seat (311). The spring member (64) is received in the seat (311) and biases the head portion (631) of the pawl piece (63) to engage the ratchet teeth (611) of the ratchet pole (61). The pawl piece (63) has a tail portion which extends through a closed side of the seat (311) and through an opening (624) formed in the leg (623) of the connector (62). The tail portion is bent so as to be hooked to the leg (623) of the connector (62) (Refer to FIG. 5).

The operation of the preferred embodiment is as follows: When the water tank is in a filled state, the stopper (613) of the ratchet pole (61) blocks the inlet opening (341) of the partition plate (34). The end portion (610) of the ratchet pole (61) extends through the cover plate (31). The primary float ball (40) floats along the water level inside the water tank. At this stage, the part (371) of the pivot arm (37) is spaced from the end portion (610) of the ratchet pole (61). The buoyant force applied by the water inside the water tank on the secondary float ball (50) causes the leg (622) of the connector (62) to abut against the uppermost edge of the notch (38), thus causing the leg (623) of the connector (62) to pull the head portion (631) of the pawl piece (63) away from the ratchet teeth (611) of the ratchet pole (61) against the action of the spring member (64).

When water inside the water tank is being drained, the water level inside the water tank gradually decreases, thereby causing gradual downward movement of the primary and secondary float balls (40, 50). Downward movement of the secondary float ball (50) continues until the leg (622) of the connector (62) abuts against the lowermost edge of the notch (38). At this stage, the spring member (64) expands so as to urge the head portion (631) of the pawl piece (63) to engage the ratchet teeth (611) of the ratchet pole (61).

Note that the volume of water inside the primary float ball (40) gives the same an appropriate weight. The weight of the primary float ball (40) must be greater than the force exerted by water coming from the external water source on the side of the flange (612) opposite to the stopper (613).

Figure 6:
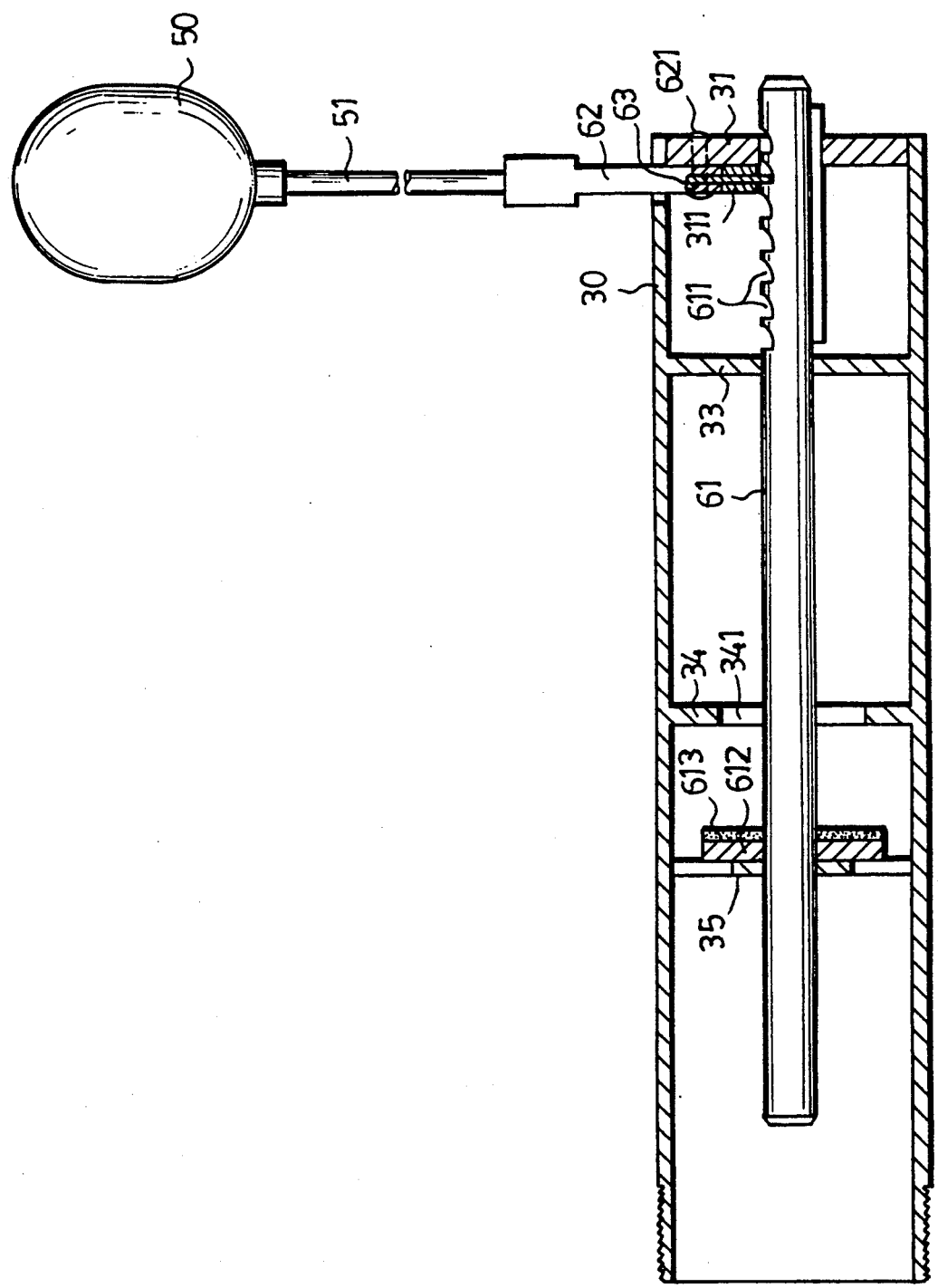
FIG. 6 is an illustration of the preferred embodiment when in the position for refilling a water tank.

As the primary float ball (40) moves downward in response to the decrease in the water level inside the water tank, the pivot arm (37) pivots about the hinge seat (36) until the part (371) of the pivot arm (37) contacts the end portion (610) of the ratchet pole (61). When the water inside the water tank no longer applies a buoyant force on the primary float ball (40), the primary float ball (40) urges the part (371) of the pivot arm (37) to apply a pushing force on the end portion (610) of the ratchet pole (61), thus causing axial movement of the ratchet pole (61) to move the stopper (613) away from the inlet opening (341), as shown in FIG. 6. The pawl piece (63) arrests untimely rightward movement of the ratchet pole (61) by engaging one of the ratchet teeth (611). Incoming water from the external water source is thus prevented from moving the stopper (613) to block the inlet opening (341). This illustrates how the preferred embodiment can be used to achieve automatic refilling of the water tank.

When the water tank is being refilled, the water level inside the water tank gradually increases, thereby eventually causing gradual upward movement of the primary float ball (40). The pushing force applied on the end portion (610) of the ratchet pole (61) is removed when the primary float ball (40) comes in contact with the water level inside the water tank. The pawl piece (63), however, still engages the ratchet pole (61), thus preventing the stopper (613) from blocking the inlet opening (341). The continued rise in the water level inside the water tank causes the pivot arm (37) to pivot about the hinge seat (36) until the part (371) of the pivot arm (37) is once more spaced from the end portion (610) of the ratchet pole (61). The water inside the water tank eventually causes gradual upward movement of the secondary float ball (50) until the leg (622) of the connector (62) abuts against the uppermost edge of the notch (38). At this stage, the spring member (64) is compressed and the head portion (631) of the pawl piece (63) disengages the ratchet teeth (611) of the ratchet pole (61). The force applied by incoming water on the side of the flange (612) opposite to the stopper (613) causes rightward movement of the ratchet pole (61) so that the stopper (613) may once more block the inlet opening (341), thereby cutting off water supply to the water tank. The water from the external water source continues to apply a force on the flange (612), thus enabling the stopper (613) to block the inlet opening (341) effectively.

The advantages and characterizing features of the float-operated valve assembly of the present invention are as follows:

1. The primary float ball (40) contains a predetermined volume of water so as to provide an appropriate weight to the same. Movement of the stopper (613) away from the inlet opening (341) only occurs when the water level inside the water tank drops to a level wherein the water no longer applies a buoyant force on the primary float ball (40).

Figure 1:
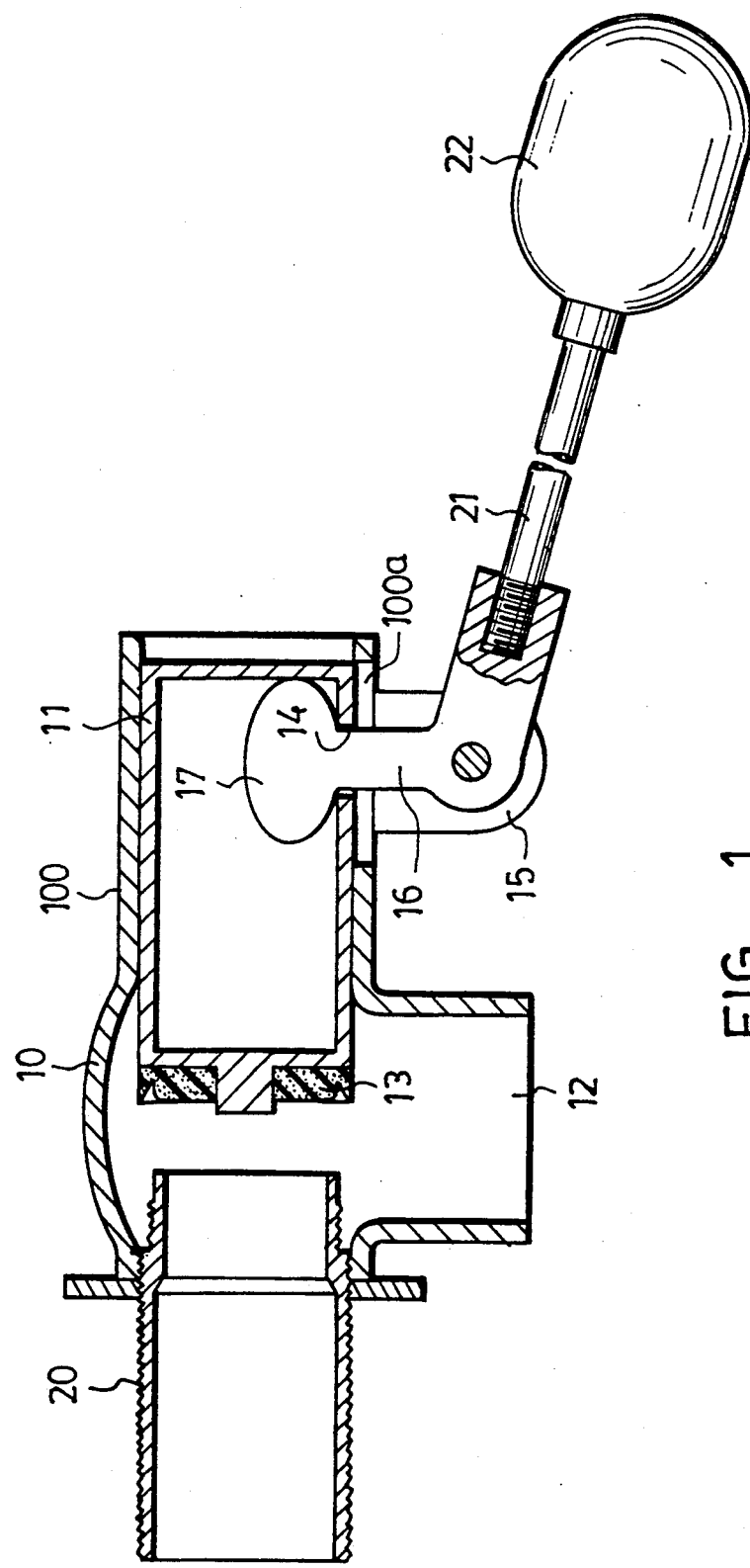
FIG. 1 is an illustration of a conventional float-operated valve assembly.

2. Blocking and unblocking movement of the stopper (613) is accomplished at a faster pace, as compared to the conventional valve assembly shown in FIG. 1. Damage to the stopper (613) is thus minimized.

3. The pawl piece (63) ensures that untimely blocking movement of the stopper (613) does not occur when the water tank is being refilled. Furthermore, the water from the external water source is used to urge the stopper (613) to block the inlet opening (341) effectively.

4. Note that when the stopper (613) blocks the inlet opening (341), no force is transmitted to the float arm (41) and to the primary float ball (40), thus preventing damage at the link between the float arm (41) and the primary float ball (40) and at the link between the float arm (41) and the connector (62).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A float-operated valve assembly for a water tank, comprising:

a valve housing to be provided inside said water tank and being formed as an elongated pipe member having a first end to be connected to an external water source, a second end sealingly closed by a cover plate, an outlet opening formed at an intermediate portion of said valve housing, and a partition plate provided inside said valve housing between said first end and said outlet opening and being formed with an inlet opening;

a float ball assembly including: a pivot arm pivotably secured to said valve housing and having a downwardly extending part disposed adjacent to said cover plate; a first float arm having one end secured to said downwardly extending part of said pivot arm; and a primary float ball mounted on the other end of said first float arm and having an appropriate weight; and an arresting mechanism including: a ratchet pole extending into said valve housing and having an end portion which extends through said cover plate adjacent to said downwardly extending part of said pivot arm, said end portion being formed with aligned ratchet teeth, said ratchet pole having one section which extends between said partition plate and said second end of said valve housing and which is provided with a stopper means that is urged by water from the external water source so as to block said inlet opening, said primary float ball urging said downwardly extending part of said pivot arm to apply a pushing force on said end portion of said ratchet pole so as to move said stopper means away from said inlet opening when water inside said water tank no longer applies a buoyant force on said primary float ball; and a separate float-controlled pawl means adapted to engage said ratchet teeth of said ratchet pole when water inside said water tank is below a predetermined level so as to arrest untimely movement of said stopper means toward said inlet opening when said water tank is being refilled, said pawl means disengaging said ratchet teeth of said ratchet pole only when water inside said water tank is at least equal to the predetermined level so as to activate said float-controlled pawl means and permitting water from the external water source to urge said stopper means to block said inlet opening when said water tank has been refilled.

2. The float-operated valve assembly as claimed in claim 1, wherein said primary float ball is a hollow spherical body which contains a predetermined volume of water.

3. The float-operated valve assembly as claimed in claim 1, wherein:

said valve housing is formed with an arcuate peripheral notch adjacent to said second end and a radial projection which protrudes inwardly adjacent to said notch; and said float-controlled pawl means comprises: a substantially L-shaped connector extending into said housing through said notch and having an intermediate portion pivoted to said radial projection of said valve housing, a first leg extending outside said valve housing and a second leg extending inside said valve housing; a second float arm having one end secured to said first leg of said connector; a secondary float ball connected to the other end of said second float arm; a pawl piece having one end mounted to said second leg of said connector; and a spring means for biasing said pawl piece to engage said ratchet teeth of said ratchet pole.

4. The float-operated valve assembly as claimed in claim 3, wherein:

said float-controlled pawl means further comprises a substantially U-shaped seat provided on an inner side of said cover plate and disposed between said second leg of said connector and said ratchet pole, said seat having an open side facing said ratchet teeth of said ratchet pole;

said pawl piece is provided with an enlarged head portion which extends into said seat and a tail portion which extends through said seat and which is mounted to said second leg of said connector; and said spring means is received in said seat and biases said head portion of said pawl piece to engage said ratchet teeth of said ratchet pole.

5. The float-operated valve assembly as claimed in claim 1, wherein said valve housing includes a support member provided inside said valve housing between said first end and said partition plate, said support member having an annular portion and a plurality of angularly spaced ribs connecting said annular portion to an inner wall surface of said valve housing.

6. The float-operated valve assembly as claimed in claim 1, wherein said valve housing includes a guide plate provided inside said valve housing between said cover plate and said outlet opening.

7. The float-controlled valve assembly as claimed in claim 1, wherein said valve housing includes a hinge seat disposed on a top side of said valve housing adjacent to said cover plate, said pivot arm being pivotably secured to said hinge seat.

* * * * *